(12) United States Patent
Fukui et al.

(10) Patent No.: US 10,591,125 B2
(45) Date of Patent: Mar. 17, 2020

(54) LIGHTING DEVICE AND TRAVELING BODY USING SAME

(71) Applicant: Panasonic Intellectual Property Management Co., Ltd., Osaka (JP)

(72) Inventors: Atsushi Fukui, Osaka (JP); Koichiro Ono, Osaka (JP); Tatsuo Dohi, Osaka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 52 days.

(21) Appl. No.: 15/766,392

(22) PCT Filed: Oct. 11, 2016

(86) PCT No.: PCT/JP2016/004535
§ 371 (c)(1),
(2) Date: Apr. 6, 2018

(87) PCT Pub. No.: WO2017/094214
PCT Pub. Date: Jun. 8, 2017

(65) Prior Publication Data
US 2019/0078743 A1    Mar. 14, 2019

(30) Foreign Application Priority Data

Dec. 4, 2015  (JP) .................................. 2015-237055
Jul. 28, 2016  (JP) .................................. 2016-147927

(51) Int. Cl.
*F21S 41/143*    (2018.01)
*G02B 13/18*    (2006.01)
(Continued)

(52) U.S. Cl.
CPC ............ *F21S 41/143* (2018.01); *F21S 41/635* (2018.01); *G02B 3/02* (2013.01); *G02B 13/18* (2013.01);
(Continued)

(58) Field of Classification Search
CPC ....... G02B 3/02; G02B 13/18; G02B 19/0014; G02B 19/0066; G02B 3/04; F21S 41/143;
(Continued)

(56) References Cited

U.S. PATENT DOCUMENTS 7,357,545 B2 *  4/2008  Stefka ..................... F21S 41/00
                                                            362/539
7,400,456 B2 *  7/2008  Smith ...................... G02B 3/04
                                                            348/E5.028
(Continued)

FOREIGN PATENT DOCUMENTS

JP    2008-107130     5/2008
JP    2010-153181 A   7/2010
(Continued)

OTHER PUBLICATIONS

International Search Report of PCT application No. PCT/JP2016/004535 dated Jan. 10, 2017.

*Primary Examiner* — Arman B Fallahkhair
(74) *Attorney, Agent, or Firm* — Wenderoth, Lind & Ponack, L.L.P.

(57) ABSTRACT

There is provided a lighting device capable of forming a line beam having a sufficiently long length in an irradiation direction. A distance between a light source end close to irradiation surface and irradiation surface is greater than a distance between lens center and irradiation surface by using light source in which a plurality of light emitters is arranged in a straight line and lens of which an emission surface having a constant curvature is corrected by an odd function.

(Continued)

Accordingly, a shape of light source is formed on irradiation surface, and thus, it is possible to form line beam having the sufficiently long length in the irradiation direction.

7 Claims, 20 Drawing Sheets

(51) Int. Cl.
  *F21S 41/63* (2018.01)
  *G02B 3/02* (2006.01)
  *F21S 41/151* (2018.01)
  *B60Q 1/115* (2006.01)
  *B60Q 1/08* (2006.01)

(52) U.S. Cl.
  CPC .............. *B60Q 1/085* (2013.01); *B60Q 1/115* (2013.01); *F21S 41/151* (2018.01)

(58) Field of Classification Search
  CPC ........ F21S 41/635; F21S 41/151; F21S 41/27; F21S 41/663; B60Q 2300/132; B60Q 2300/324; B60Q 230/42; B60Q 1/085; B60Q 1/115; B60Q 1/143; B60Q 1/22
  See application file for complete search history.

(56) References Cited

U.S. PATENT DOCUMENTS

| | | | | |
|---|---|---|---|---|
| 7,410,279 | B2* | 8/2008 | Kawashima | F21S 41/155 362/507 |
| 7,534,020 | B2* | 5/2009 | Moisel | F21S 41/663 362/545 |
| 8,042,980 | B2* | 10/2011 | Ookubo | F21V 13/02 362/512 |
| 8,895,910 | B2* | 11/2014 | Sangu | G01J 5/0025 250/216 |
| 9,638,386 | B2* | 5/2017 | Iwasaki | B60Q 1/24 |
| 9,803,821 | B2* | 10/2017 | Iha | F21S 41/19 |
| 9,945,528 | B2* | 4/2018 | Suwa | F21S 41/143 |
| 2008/0247188 | A1* | 10/2008 | Woodward | G02B 19/0066 362/554 |
| 2013/0021812 | A1 | 1/2013 | Schug et al. | |
| 2014/0175978 | A1 | 6/2014 | Kobayashi | |
| 2015/0043239 | A1* | 2/2015 | Han | F21S 41/663 362/520 |

FOREIGN PATENT DOCUMENTS

| | | |
|---|---|---|
| JP | 2013-522853 A | 6/2013 |
| WO | 2013/031210 A1 | 3/2013 |

* cited by examiner

FIG. 20
(a)
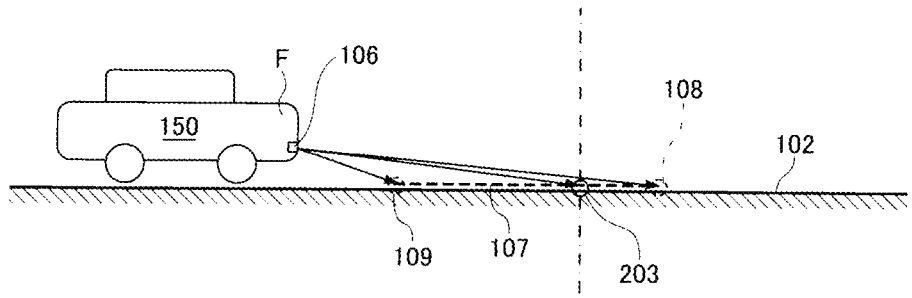
(b)
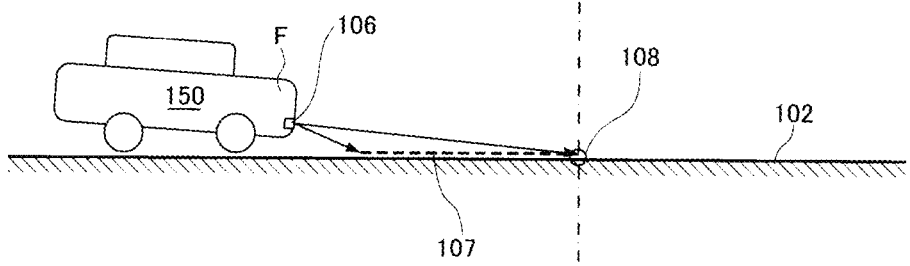
(c)
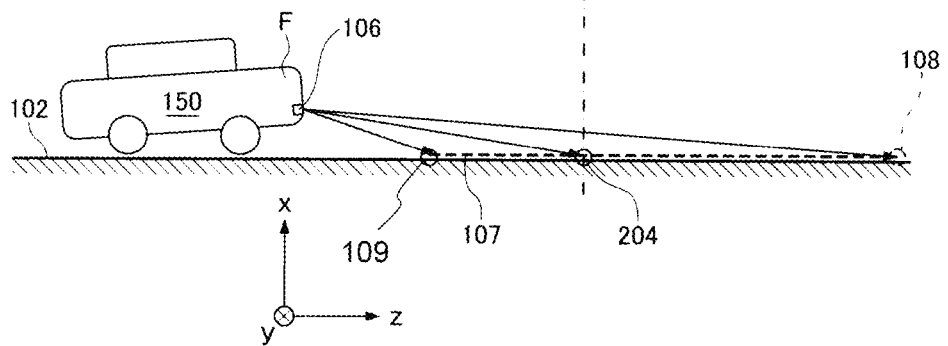

LIGHTING DEVICE AND TRAVELING BODY USING SAME

This application is a U.S. national stage application of the PCT International Application No. PCT/JP2016/004535 filed on Oct. 11, 2016, which claims the benefit of foreign priority of Japanese patent application 2015-237055 filed on Dec. 4, 2015 and Japanese patent application 2016-147927 filed on Jul. 28, 2016, the contents all of which are incorporated herein by reference.

TECHNICAL FIELD

The present disclosure relates to a lighting device which illuminates an irradiation surface, and a traveling body having the lighting device mounted thereon.

BACKGROUND ART

As a lighting device of the related art, there is a lighting device that forms a line beam which has a thin irradiation width and a long irradiation surface in a near and far direction. There is a lighting device that uses a semiconductor laser as a light source and has a rod lens which forms irradiation light in a line shape. FIG. 28 shows a lighting device described in PTL 1.

In FIG. 28, emission light from laser beam source 1 is rendered to substantially parallel light by a collimator lens 4 including lens 2 and lens 3, and becomes a small circular light ray. Light spreads in only one direction by rod lens 5 of which a curvature of an emission side is constant in the one direction, and thin line beam 7 is formed on irradiation surface 6.

CITATION LIST

Patent Literature

PTL 1: Japanese Patent Unexamined Publication No. 2008-107130

SUMMARY OF THE INVENTION

However, in the lighting device using the laser beam, the irradiation surface close to the light source may not be sufficiently irradiated in some cases.

The present disclosure has been made in view of the problems of the related art, and it is an object to provide a lighting device capable of forming a line beam having a sufficiently long length in an irradiation direction.

In order to achieve the object, a light device which is one embodiment of the present disclosure is a lighting device that forms a line beam on an irradiation surface. The lighting device includes a light source that includes a plurality of light emitters arranged in a line, and a lens that is disposed in a direction in which light is emitted from the light source, and in which at least any one of an incident surface and an emission surface is a curved surface. A contour shape of a section, which includes an arrangement direction of the light emitters, at least any one of the incident surface or the emission surface which is the curved surface of the lens is a shape in which a curve represented by an odd function is added to a curve having a constant curvature, and the light emitted from the light source is refracted by the lens to be incident on the irradiation surface to form the line beam.

A traveling body which is another embodiment of the present disclosure is mounted with the lighting device, and forms the line beam on a road surface.

With such a configuration, the distance between the light source end close to the irradiation surface and the irradiation surface is set to be greater than the distance between the lens center and the irradiation surface by using the light source in which the plurality of light emitters is arranged in the straight line and the lens in which the emission surface having the constant curvature is corrected by the odd function. Thus, it is possible to form the shape of the light source on the irradiation surface, and it is possible to form the line beam having the sufficiently long length in the irradiation direction.

BRIEF DESCRIPTION OF DRAWINGS

FIG. 20 shows a diagram showing a line beam (a) when the vehicle has the horizontal posture according to Exemplary Embodiment 5 of the present disclosure, a line beam (b) when the vehicle has the posture of which the front part tilts downwards, and a line beam (c) when the vehicle has the posture of which the front part tilts upwards.

DESCRIPTION OF EMBODIMENTS

Hereinafter, exemplary embodiment of the present disclosure will be described with reference to the drawings.

Constituent elements that perform the same actions will be described while being assigned the same reference marks.

(Exemplary Embodiment 1)

Figure 1:
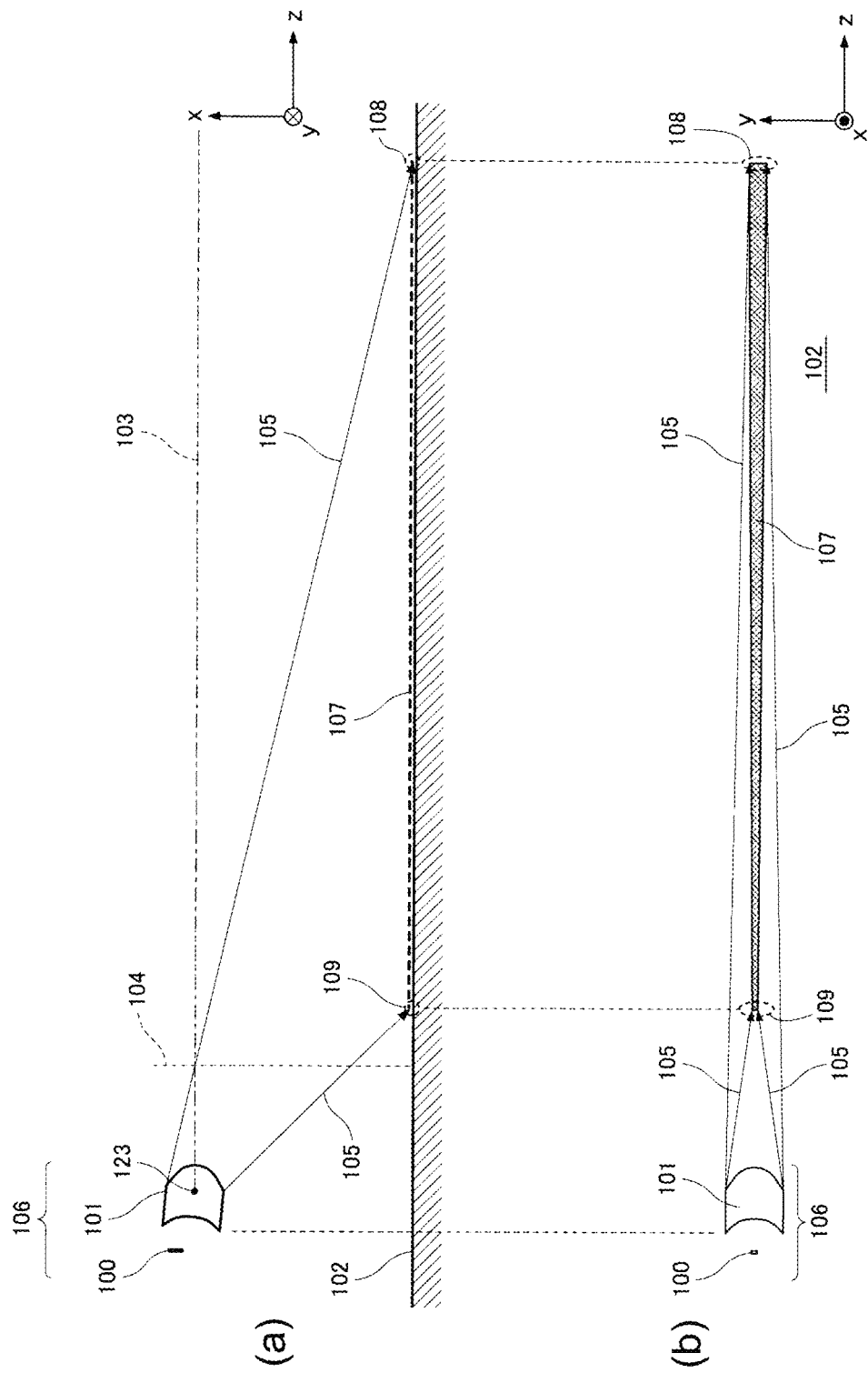
FIG. 1 is a schematic diagram of a lighting device according to Exemplary Embodiment 1 of the present disclosure.

FIG. 1 is a schematic diagram of a lighting device according to Exemplary Embodiment 1 of the present disclosure, and shows a side view (FIG. 1(a) and a top view (FIG. 1(b)) which shows the relationship between the lighting device and irradiation light.

In FIG. 1, it is assumed that an x-axis is an up direction on the paper, a y-axis is a depth direction on the paper, and a z-axis is a right-handed direction on the paper. The side view of FIG. 1 is a diagram when lighting device 106 that forms a line beam is viewed in the y-axis direction, and the top view of FIG. 1 shows lighting device 106 when viewed in the x-axis direction and line beam 107 which is irradiation light on irradiation surface 102.

In FIG. 1, light source 100 is constituted by, for example, light emitters having high straightness, such as light-emitting diodes, and hereinafter, is referred to as an LED). For example, light source 100 is configured such that a plurality of LEDs is arranged on an xz section so as to be approximately close to each other in the x-axis direction. Adjacent light emitters may be arranged so as to be close to each other, or may be arranged with a space in a range in which light and darkness of line beam 107 are not increased. The light emitters may be arranged in a row, or may be arranged in multiple rows so as to be in approximately parallel with each other.

Lens 101 is a lens which forms line beam 107 on irradiation surface 102 by receiving emission light of light source 100 as incident light and emitting emission light rays 105. Lens 101 is made of glass which is a material having light transmittance, or is made of resin such as polycarbonate or acryl having light transmittance. Irradiation surface 102 is a plane in approximately parallel with an yz plane. Horizontal plane 103 is a horizontal plane passing through lens center 123 of lens 101, and is parallel to the yz plane. Observation surface 104 is an observation surface for observing emission light rays 105 of lens 101.

As stated above, lighting device 106 includes light source 100 and lens 101.

Line beam 107 is formed by illuminating irradiation surface 102 with emission light rays 105 emitted by lens 101, and has a line shape elongated in the z-axis direction. Line distal end 108 indicates a line distal end of line beam 107, that is, an end of line beam 107 in a positive z-axis direction. Line proximal end 109 indicates a line proximal end of line beam 107, that is, an end of line beam 107 in a negative z-axis direction. Line beam 107 is a length from line distal end 108 to line proximal end 109.

Figure 2:
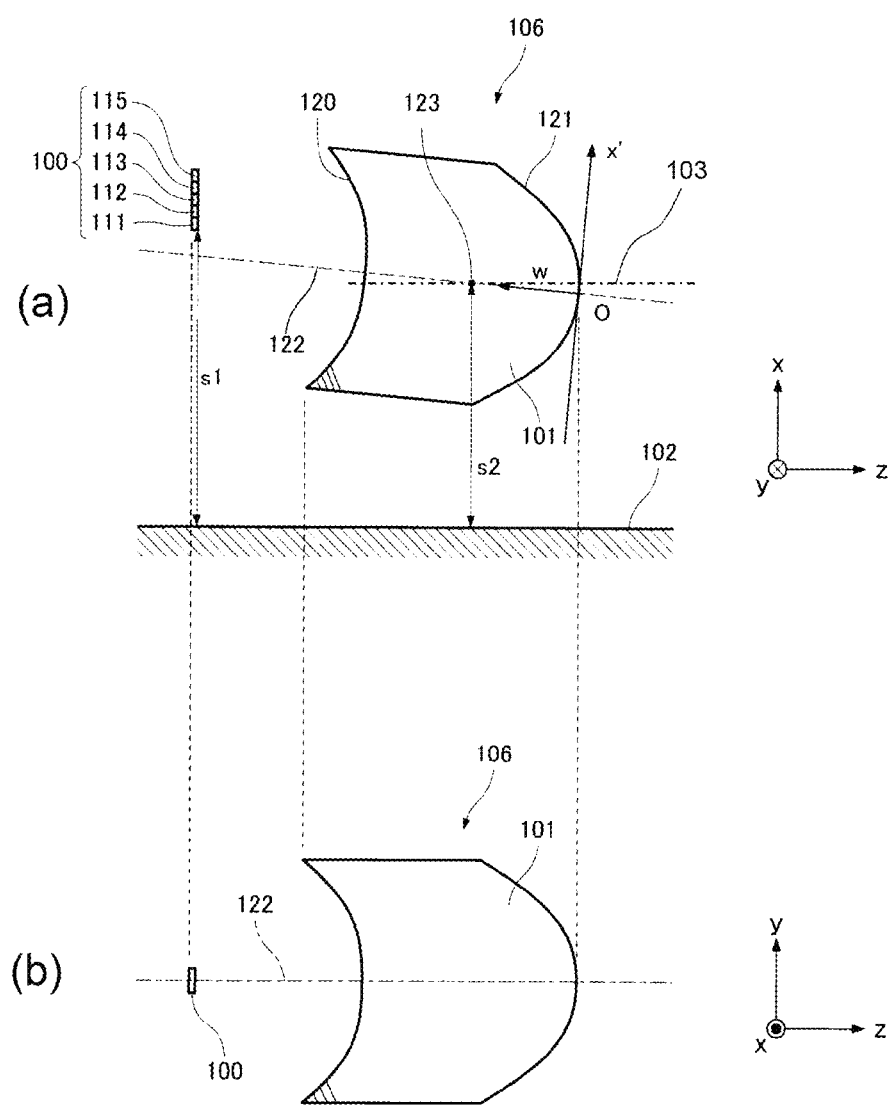
FIG. 2 is a diagram showing a configuration of a lens and a light source of the lighting device according to Exemplary Embodiment 1 of the present disclosure.

FIG. 2 is a diagram showing the configuration of light source 100 and lens 101 of lighting device 106, and shows a sectional view (FIG. 2(a)) when viewed in the y-axis direction and a top view (FIG. 2(b)) when viewed in the x-axis direction.

Incident surface 120 is an incident surface of lens 101, and emission light emitted from light source 100 is incident on the incident surface. A shape of incident surface 120 is an aspherical shape which has rotational symmetry with respect to lens center axis 122. Lens center axis 122 is an axis that connects a vertex of a lens surface of incident surface 120 of lens 101 and a vertex of a lens surface of emission surface 121. Lens center 123 is positioned in approximately the middle between the vertex of the lens surface of incident surface 120 and the vertex of the lens surface of emission surface 121.

Emission surface 121 from which light incident from incident surface 120 of lens 101 is emitted has a contour shape in which a line segment represented by an arc which is formed on the xz section including an arrangement direction of light source 100 and lens center axis 122 so as to have a constant curvature is corrected by a line segment represented by an odd function. For example, emission surface 121 has a rotational asymmetrical shape acquired by correcting a rotational symmetrical figure having a constant curvature with lens center axis 122 as a center by using the odd function on the xz section. The odd function is a linear combination of linear, cubic, quintic, and septic functions. It is assumed that the odd function is represented by f(x), odd coefficients are linear coefficient a1, cubic coefficient a3, and quintic coefficient a5, the odd function is represented by $f(x)=(a1) \times x+(a3) \times x^\wedge 3+(a5) \times x^\wedge 5 \ldots$ Sign ^ represents a power, and is, for example, $x^\wedge 3=x \times x$. It is preferable that the cubic function is used as the odd function, and the cubic function is used as an example of the odd function will be described in the following description.

Emission surface 121 acquired by correcting the rotational symmetrical figure due to the use of the odd function is emission surface 121, which is acquired by representing a contour shape on the xz section of a lens which has a constant curvature and has a rotational symmetrical figure, as a quadratic function, and representing a function which is the sum of the quadratic function and the odd function, as a contour shape on the xz section. When the emission surface is represented by an odd function of z with respect to x which passes through an origin, the odd function in which a value of x is negative in a positive region of z and a value of x is positive in a negative region of z. When the odd function is added to a quadratic function representing a contour shape having a constant curvature, emission surface 121 has a contour shape in which a curvature is increased in the positive area of the x-axis and a curvature is decreased in the negative area of the x-axis. The contour figure of the lens which is a correction target is not limited to the rotational symmetrical figure, and any figure may be used as long as the contour shape on the xz section including the arrangement direction of light source 100 and lens center axis 122 on the xz section is an arc figure having a constant curvature.

Figure 11:
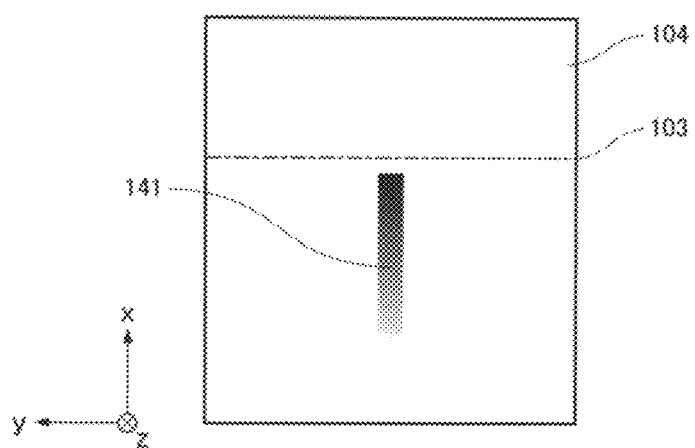
FIG. 11 is a diagram showing an illuminance distribution on an observation surface according to Exemplary Embodiment 1 of the present disclosure.

As stated above, line proximal end 109 of line beam 107 shown in FIG. 11 can come into contact with light source 100 by using lens 101 of which emission surface 121 has a high curvature on the positive side of the x-axis and positioning light source 100 from irradiation surface 102 so as to be higher than horizontal plane 103 passing through lens center 123 of lens 101, that is, in a positive x-axis direction, compared to a case where the lens having a constant curvature is used.

The cubic function is used as the odd function. Thus, as the value of x becomes further away from 0 on the z-axis, the value of x is sharply increased. Thus, as a region of the lens surface becomes further away from the vertex of the lens surface, the radius of curvature of emission surface 121 is increased at a high ratio. Line proximal end 109 of line beam 107 can further come into contact with light source 100. Thus, it is preferable that the cubic function is used as the odd function. That is, emission surface 121 is characterized in that as the region of the lens surface becomes further away from the vertex of the lens surface, the radius of curvature is increased in a position above at least the vertex of the lens surface. It is preferable that as the position on the lens surface becomes further away from the vertex of the lens surface, a change rate of the radius of curvature is increased. Line beam 107 of a region close to light source 100 is able to be lengthened by increasing the radius of curvature of only the region far away from the vertex of emission surface 121. However, since a change of the light amount of line beam 107 in a lengthwise direction is excessively increased, it is preferable that the radius of curvature is gradually changed by using emission surface 121 corrected by the odd function. When the lens having the rotational symmetrical shape is used, the beam spreads both in the x-axis direction and the y-axis direction, and the illuminance of line beam 107 is decreased. It is possible to form line beam 107 having high illuminance by lengthen line beam 107 in only a required direction, that is, in only a region close to light source 100 by the odd function.

Since light source 100 is provided in a position higher than lens center 123, only emission light ray 105 (FIG. 1) above the vertex of emission surface 121 in the positive x-axis direction is output. Thus, the correction using the odd function may be performed on only a portion above the vertex of emission surface 121 in the positive x-axis direction.

In FIG. 2, LED 111, LED 112, LED 113, LED 114, and LED 115 are LEDs which are examples of the light emitters constituting light source 100, and are arranged adjacent to each other in this order so as to be in a straight line from the negative x-axis direction to the positive direction. A shape of a light emission surface of each of LED 111 to LED 115 in the z-axis direction is a rectangle.

Emission light amounts of LED 111 to LED 115 are decreased in the order from LED 111 to the LED 115 (as the position of the LED is further away from the ground which is irradiation surface 102), but may be set so as to be equal to each other. That is, the light amounts thereof may satisfy that light amount of LED 111≥light amount of LED 112≥light amount of LED 113≥light amount of LED 114≥light amount of LED 115.

When an emission size which is an area of the emission surface of the LED is the size of the irradiation surface of the xy plane on the light emission surface of the LED in the z-axis direction, LED 111 to LED 115 may be arranged such that the emission sizes thereof are increased in the order from LED 111 to LED 115 (as the LED becomes further away from the ground which is irradiation surface 102) or equal to each other. That is, the emission sizes may satisfy that emission size of LED 115 emission size of LED 114 emission size of LED 113≥emission size of LED 112≥emission size of LED 111.

When a distance between irradiation surface 102 and an end of light source 100 close to irradiation surface 102, that is, an end of LED 111 close to irradiation surface 102 in the x-axis direction is s1 and a distance between irradiation surface 102 and lens center 123 in the x-axis direction is s2, the light source is disposed such that s1 is greater than s2. That is, s1>s2.

In FIG. 2, a coordinate axis x'yw is set on the lens emission surface. When the vertex of the lens surface of emission surface 121 of the lens is used as origin O of the coordinate axis, the w-axis is parallel to lens center axis 122, and the direction is a direction opposite to the z-axis. The x'-axis is an axis which is on the xz section, is perpendicular to lens center axis 122, and uses the positive x-axis direction as the positive direction. The x'-axis and the w-axis are used in the following description. In the top view of FIG. 2, light source 100 is disposed on lens center axis 122.

Hereinafter, the line beam formed on irradiation surface 102 by light source 100 and lens 101 will be described. Initially, a case where lens 101 is a lens which is not corrected by the cubic function, that is, a case where the lens has the rotational symmetrical shale around lens center axis 122 will be described.

Figure 3:
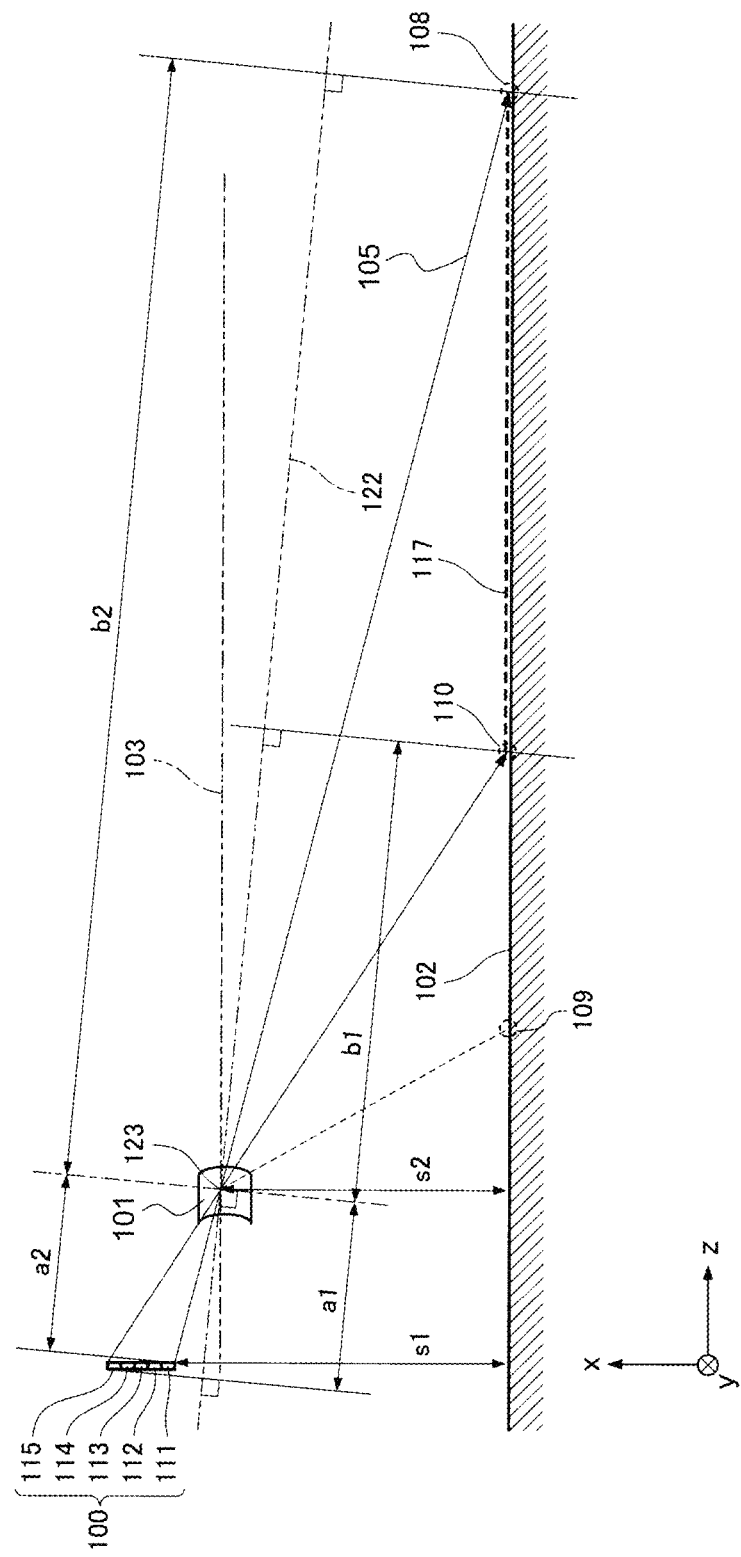
FIG. 3 is a diagram showing an image forming relationship between an irradiation surface and a light source of a lighting device according to a comparative example.

FIG. 3 is a diagram showing an image forming relationship between an irradiation surface and a light source of a line lighting device according to a comparative example, and shows an xz section of the line lighting device similarly to the side view of FIG. 1. A lens shape is omitted for the sake of simplicity. In FIG. 3, the same constituent elements as those in FIGS. 1 and 2 will be assigned the same reference marks, and thus, the description thereof will be omitted.

It is assumed that a distance between lens center 123 and an end of LED 111 in the negative x-axis direction in the direction of lens center axis 122 is a2. It is assumed that an intersection at which a line passing through the end of LED 111 in the negative x-axis direction and lens center 123 crosses irradiation surface 102 is line distal end 108 and a distance between lens center 123 and line distal end 108 in the direction of lens center axis 122 is b2.

Similarly, it is assumed that a distance between lens center 123 and an end of LED 115 in the positive x-axis direction in the direction of lens center axis 122 is a1. It is assumed that an intersection at which a line passing through the end of LED 115 in the positive x-axis direction and lens center 123 crosses the irradiation surface is line proximal end 110 and a distance between lens center 123 and line proximal end 110 in the direction of lens center axis 122 is b1. Line proximal end 110 is closer to the positive z-axis direction than line proximal end 109 described in FIG. 1. That is, when the cubic function is not included in lens 101, a length of line beam 117 is short.

It is assumed that the focal length of the lens is f, distances a1, a2, b1, and b2 are determined such that lens image-forming formulas $$1/f = 1/a1 + 1/b1 \quad \text{(Expression 1)}$$

and $$1/f = 1/a2 + 1/b2 \quad \text{(Expression 2)}$$

are satisfied. Thus, light source 100 is formed and projected onto irradiation surface 102, that is, a clear line beam can be formed on irradiation surface 102.

In this case, the light emitted from LED 111 forms line distal end 108, and the light emitted from LED 115 forms line proximal end 110. Since distance s1 between irradiation surface 102 and the end of LED 111 in the x-axis direction is set so as to be greater than distance s2 between lens center 123 and irradiation surface 102, a line passing through lens center 123 and the end of LED 111 in the negative x-axis direction necessarily crosses irradiation surface 102. That is, light is not output from above horizontal surface 103. Since the light emitted from LED 111 forms line distal end 108 and a side closer to light source 100 than the line distal end, that is, irradiation surface 102 in the negative z-axis direction is irradiated with the light rays of LED 112, LED 113, LED 114, and LED 115, all emission light rays 105 from lens 101 are projected on irradiation surface 102.

Since b2>b1, a2<a1 from (Expression 1) and (Expression 2), and the LEDs are arranged such that LED 111 is closer to the lens and LED 115 is further away from the lens on the xz section. That is, LED 111 and LED 115 are arranged such that the distance between LED 115 and lens center 123 of lens 101 is greater than the distance between LED 111 and lens center 123 of lens 101 in the direction of lens center axis 122.

A width of line beam 117, that is, an irradiation width in the y-axis direction is b2/a2 times a width of LED 111 in the y-axis direction at line distal end 108.

Similarly, the width of the line beam is b1/a1 times the width of LED 115 in the y-axis direction at line proximal end 110.

In the aforementioned arrangement, line beam 117 from line distal end 108 to line proximal end 110 is formed, since light source 100 is formed on irradiation surface 102 as much as the length of line beam 117, the length of line beam 117 is limited to a length with which light source 100 is disposed in the x-axis direction.

Hereinafter, an example in which line beam 107 is lengthened by adding the cubic function to emission surface 121 of lens 101 will be described.

Figure 4:
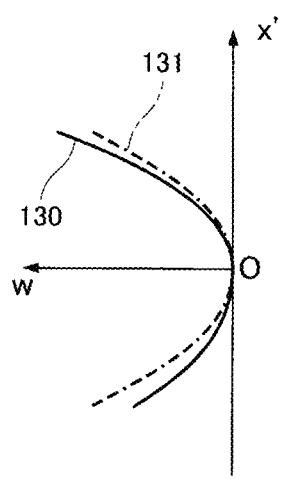
FIG. 4 is a graph for describing an example of a shape of the lens according to Exemplary Embodiment 1 of the present disclosure.
Figure 5:
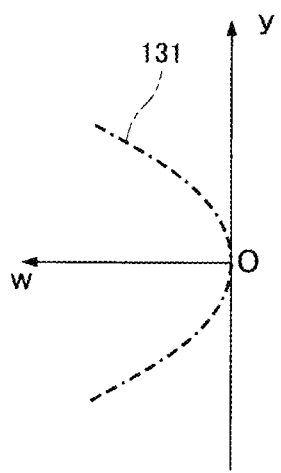
FIG. 5 is a graph for describing an example of the shape of the lens according to Exemplary Embodiment 1 of the present disclosure.
Figure 6:
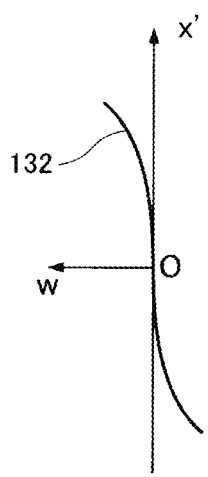
FIG. 6 is a graph showing a cubic function component on an x'w section of the lens according to Exemplary Embodiment 1 of the present disclosure.
Figure 7:
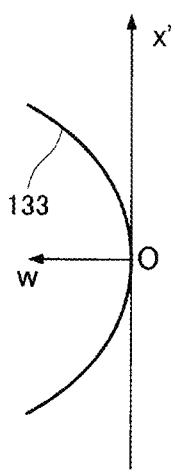
FIG. 7 is a graph showing a slope of the graph of FIG. 6.
Figure 8:
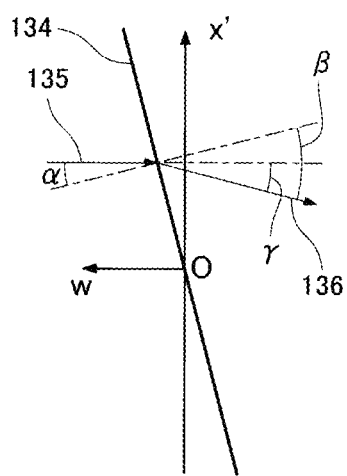
FIG. 8 is a graph for describing a change in direction of a light ray due to the lens according to Exemplary Embodiment 1 of the present disclosure.

FIGS. 4 to 8 are graphs for describing a lens shape of emission surface 121 of lens 101 of FIG. 2 according to Exemplary Embodiment 1 of the present disclosure. FIG. 4 shows an x'w section of lens 101, and FIG. 5 shows an yw section of lens 101. FIG. 6 shows a cubic function component on the x'w section of lens 101, and FIG. 7 shows a slope of a graph of FIG. 6, that is, a differential value. FIG. 8 is a graph for describing a change in direction of the light rays due to lens 101.

In FIG. 4, lens shape 130 is a lens shape of emission surface 121 of the lens of FIG. 2 on the x'w section, and is represented by a contour shape on the wx' section. Lens shape 131 is a lens shape of a rotational symmetrical component having a constant curvature in the emission surface acquired by removing the cubic function component from lens shape 130, and is similarly represented by a contour shape on the wx' section. Lens shape 131 is the same as the yw section of emission surface 121 of the lens shown in FIG. 5.

In FIG. 6, cubic function 132 has a shape in which lens shape 131 which is the rotational symmetrical shape is subtracted from lens shape 130 of FIG. 4, and is represented by a cubic function constituted by w and x. Cubic function 132 is formed such that a tangent line is approximately in parallel with the x'-axis at origin O, a value of w gradually is increased toward a positive x'-axis direction, and a value of w is gradually decreased toward a negative x'-axis direction.

Light rays emitted from lens shape 130 corrected by the cubic function are influenced by cubic function 132 unlike lens shape 131 of the rotational symmetrical shape. A direction of the light ray due to cubic function 132 is changed in proportion to the slope of cubic function 132. Hereinafter, a change in the direction of the light ray due to an inclination of the surface on the x'w section is shown in FIG. 8.

In FIG. 8, it is assumed that the emission surface at origin O is the x'-axis and an object made of a material having light transmittance of refractive index n is present in the w-axis direction, when this object becomes emission surface 134 by rotating around origin O in a counterclockwise direction, that is, by tilting with a positive slope, a change in direction of emission light ray 135 is shown.

When the emission surface becomes emission surface 134 and it is assumed that an incident angle of emission light ray 135 is $\alpha$ and an emission angle is $\beta$, n x sin($\alpha$)=sin($\beta$) from Snell's law. In general, since refractive index n of the material having light transmittance is greater than 1, $\beta > \alpha$. Change $\gamma$ in direction of the light ray is $\gamma = \beta - \alpha > 0$, and the direction of the light ray is changed in the negative x'-axis direction.

As shown in FIG. 7, a value of w of slope component 133 of the cubic function is a value close to zero near the origin, and is positive value when the value of w is far away from the origin. Thus, the direction of emission light ray 135 from lens shape 130 is changed in one direction, that is, the negative x' direction in this case. In FIGS. 2 and 3, the direction in the negative x' direction is changed to a direction in which the light ray rotates around the y-axis in a clockwise direction, and is a direction in which line beam 107 (see FIG. 1) is lengthened toward light source 100. Since slope component 133 of the cubic function is a value close to zero near the origin and there is a component which does not contribute to the direction change of the emission light ray, the position of line distal end 108 of line beam 117 of FIG. 3 is not changed from the position of line distal end 108 of line beam 107 of FIG. 1, and line proximal end 110 of FIG. 3 is lengthened up to line proximal end 109 of FIG. 1 toward light source 100.

Hereinafter, the emission light ray and the lens according to Exemplary Embodiment 1 will be described with reference to FIG. 9.

Figure 9:
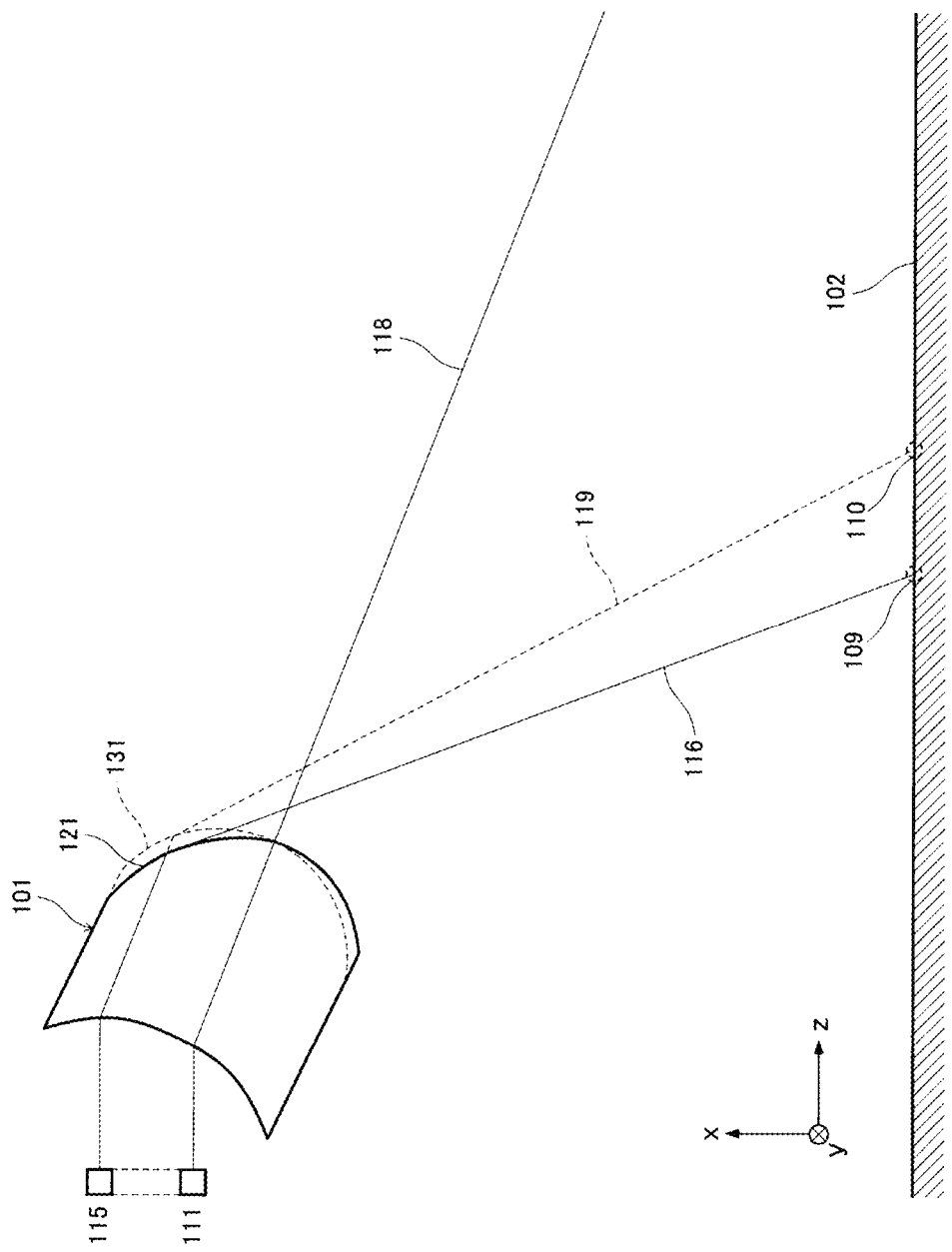
FIG. 9 is a diagram for describing the relationship between an emission light ray and the lens of the lighting device according to Exemplary Embodiment 1 of the present disclosure.

FIG. 9 is a diagram for describing the relationship between the emission light ray and the lens of the line lighting device according to Exemplary Embodiment 1 of the present disclosure.

Emission surface 121 of lens 101 has a shape in which lens shape 131 having a constant curvature is corrected by the cubic function and as the region of the lens surface becomes further away from the vertex of emission surface 121 in the positive x-axis direction, the radius of curvature is gradually increased. Since emission light ray 118 emitted from LED 111 is refracted near the vertex of emission surface 121 and a curvature difference between lens shape 131 and emission surface 121 near the vertex is small, emission light rays 118 from a lens having a constant curvature which is lens shape 131 and lens 101 which is emission surface 121 are substantially the same. The position on irradiation surface 102 irradiated with emission light ray 118 is line distal end 108 (FIG. 1). Emission light ray 119 emitted from LED 115 is refracted by a lens having a constant curvature which is lens shape 131, and irradiation surface 102 is irradiated with the refracted light ray. Similarly, emission light ray 116 emitted from LED 115 is refracted by lens 101, and irradiation surface 102 is irradiated with the refracted light ray. When the curvature of the lens having a constant curvature which is lens shape 131 through which emission light ray 119 passes is compared with the curvature of emission surface 121 of lens 101 in a position through which emission light ray 116 passes, the curvature of emission surface 121 is greater. Thus, emission light ray 116 is refracted at a larger angle than emission light ray 119. Accordingly, line proximal end 109 which is the position on irradiation surface 102 is irradiated with emission light ray 116 is closer to the light source than line proximal end 110 which is the position on irradiation surface 102 is irradiated with emission light ray 119. That is, the line beam applied by LEDs 111 to 115 is lengthened so as to be closer to the light source in a case where the emission light ray is refracted by the lens having a constant curvature than in a case where the emission light ray is refracted by lens 101 which is an example of the invention related to the present disclosure.

Figure 10:
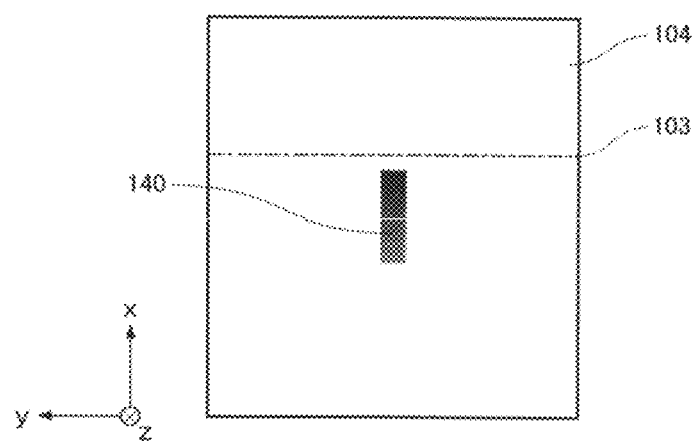
FIG. 10 is a diagram showing an illuminance distribution on an observation surface of a lighting device according to the related art.

FIG. 10 shows an illuminance distribution on an observation surface of a line lighting device according to the related art. FIG. 11 is an illuminance distribution on an observation surface according to Exemplary Embodiment 1 of the present disclosure and shows an illuminance distribution on observation surface 104 disposed between line proximal end 109 and lens 101 of FIG. 1.

FIG. 10 of a comparative example shows illuminance distribution 140 when the emission surface of the lens has the rotational symmetrical shape like lens shape 131 of FIG. 5.

In contrast, FIG. 11 of Exemplary Embodiment 1 shows illuminance distribution 141 when emission surface 121 of the lens of lens 101 is corrected by the cubic function like lens shape 130 of FIG. 4. As stated above, the cubic function is added to emission surface 121 of the lens, and thus, the illuminance distribution is lengthened in the negative x-axis direction and the illuminance distribution is not lengthened in the positive x-axis direction. Accordingly, a region above horizontal plane 103 is not able to be irradiated with the light.

Figure 12:
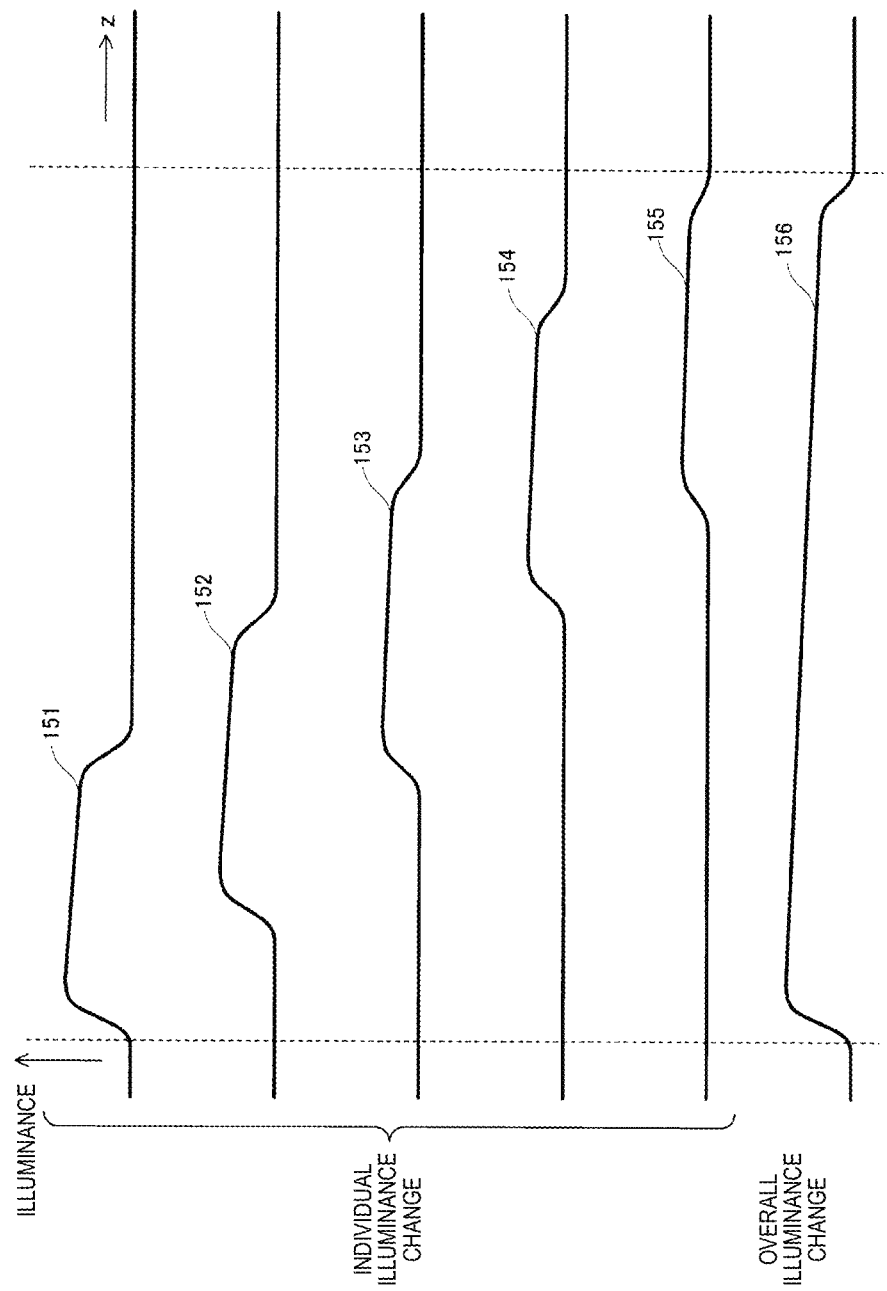
FIG. 12 is a diagram showing an illuminance distribution of a line beam according to Exemplary Embodiment 1 of the present disclosure.

FIG. 12 is a diagram showing an illuminance distribution of line beam 107 according to Exemplary Embodiment 1 of the present disclosure, and shows individual illuminance changes 151 to 155 on irradiation surface 102 of the beams individually applied by LEDs 111 to 115 shown in FIG. 2 and overall illuminance change 156 of line beam 107 shown in FIG. 1 in the z-axis direction.

As shown in FIGS. 1, 2, and 12, individual illuminance change 155 indicates a change in illuminance from LED 115. Individual illuminance change 154 indicates a change in illuminance from LED 114. Individual illuminance change 153 indicates a change in illuminance from LED 113. Individual illuminance change 152 indicates a change in illuminance from LED 112. Individual illuminance change 151 indicates a change in illuminance from LED 111. Overall illuminance change 156 indicates a change in illuminance when all LED 111 to LED 115 are turned on.

As the emission light ray becomes further away from light source 100, that is, as the emission light ray becomes closer to the positive z-axis direction, emission light ray 105 further spreads. Thus, since the width of line beam 107 is widened, the illuminance is decreased. However, the light amounts of LED 111 to LED 115 are adjusted, and the light amounts are increased in the order from LED 115 to LED 111. Thus, it is possible to reduce a decrease in illuminance in the positive z-axis direction, and it is possible to form line beam 107 which is bright even on a far side. The widths of LED 111 to LED 115 in the y-axis direction are decreased in the order from LED 115 to LED 111. Thus, it is possible to decrease the width of line beam 107 in the y-axis direction in the positive z-axis direction, and it is possible to form a thin line beam having good visibility.

As stated above, the light source in which at least two or more LEDs are arranged in a straight line and the lens which is corrected by the cubic function and in which the curvature of the emission surface is increased as the region of the emission surface becomes further away from the irradiation surface are used. The light source and the lens are arranged such that the distance between the light source end close to the irradiation surface and the irradiation source is greater than the distance between the lens center and the irradiation surface, and the LED shape of the light source is formed on the irradiation surface. With such a configuration, it is possible to form a thin line beam having good visibility.

Light source 100 uses white light as the emission light by coating a blue LED with phosphor. Alternatively, as the light source, blue, red, and green may be arranged without using phosphor. The light source is not limited to the LED, and the light emitters having high straightness may be arranged.

When semiconductor lasers are used as the light emitters, since emission efficiency due to heat is greatly decreased in the semiconductor laser and there is a possibility that the laser beam will influence the human body, it is preferable that the LEDs are used as the light emitters from the viewpoint of thermal tolerance and safety.

Although it has been described that irradiation surface 102 is the plane, and the irradiation surface may have a slight unevenness or may be a curved surface.

Although it has been described that the cubic function is used as the odd function, an odd function which is a linear combination of odd functions of degree one or greater. The linear function as the odd function has the same effect as the displacement of lens 101 in the x-axis direction, an odd function of degree three or greater may be used as the odd function.

Although it has been described that the odd function is added to emission surface 121 of lens 101, the odd function may be added to both incident surface 120 and emission surface 121 or may be added to only incident surface 120.

Although it has been described that lens 101 is a single lens, the lens may be a group lens including two or more lens. The group lens is used, and thus, a thickness of lens 101 in the z-axis direction is reduced. However, since an interface between air and the lens is widened and surface reflection is increased, when the light amount of light source 100 is the same, the illuminance of line beam 107 on irradiation surface 102 is slightly decreased.

Although it has been described in the present exemplary embodiment that emission surface 121 of the lens is corrected by the cubic function and the line beam on the irradiation surface is lengthened toward only the light source, the line beam may be lengthened toward both the light source and the far side by using an even function. However, since the line beam is lengthened toward both the light source and the far side, the illuminance of the line beam is decreased. Thus, when the lens is corrected by the even function, it is more important that the emission light ray is refracted in a position above the vertex of the lens.

The number of LEDs of light source 100 is limited to five, and a plurality of LEDs may be used. It is not necessary to constantly turn on all the LEDs of light source 100, and the LEDs may illuminate the irradiation surface in a dashed line shape by individually turning on the LEDs. Although it has been described that the shape of the light emission surface the LED of light source 100 in the z-axis direction is a rectangle, the shape of the LED may be a square. The shape of the LED may be a circle or a polygon as long as illuminance unevenness of line beam 107 in the z-axis direction slightly protrudes.

Although it has been described above that the length of line beam 107 in the near and far direction from lens 101 is lengthened by arranging the LEDs in the x-axis direction and changing the curvature of lens 101 in the x-axis direction, the irradiation light of lens 101 may be lengthened in the width direction by arranging the LEDs in the y-axis direction and changing the curvature of lens 101 in the y-axis direction. The present disclosure is not limited to line beam 107, and an irradiation region may be widened in the near and far direction and the width direction by arranging the LEDs in a lattice shape and changing the curvature of lens 101 in both the x-axis and y-axis directions.

(Exemplary Embodiment 2)

Figure 13:
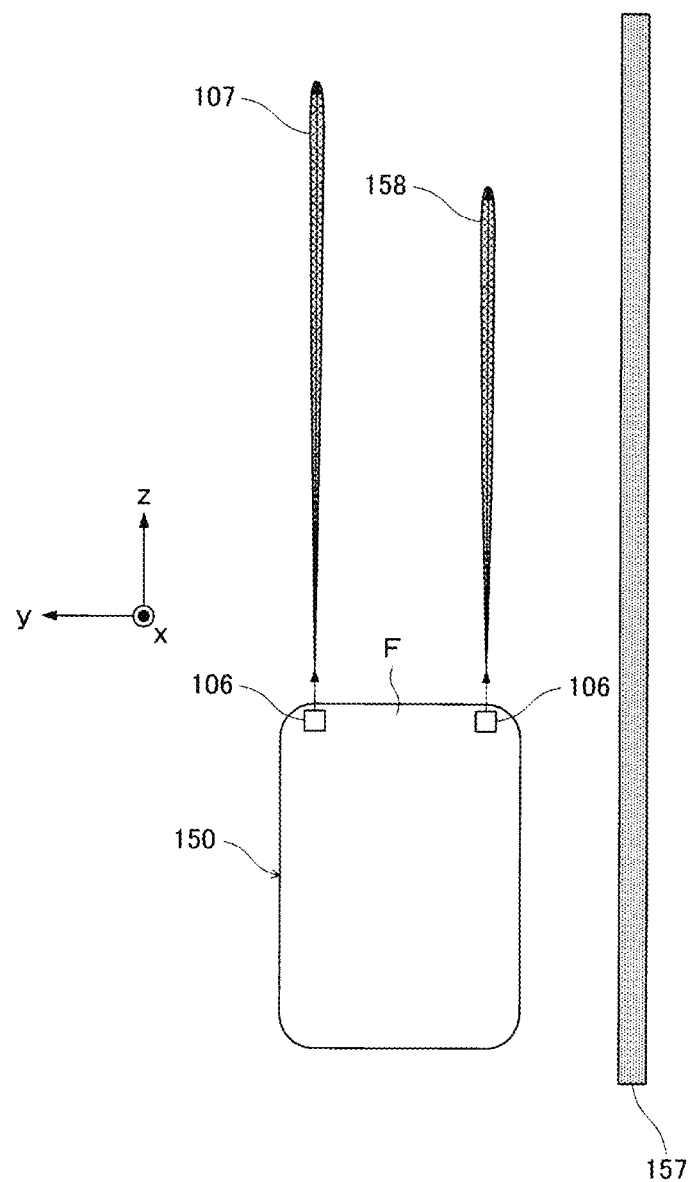
FIG. 13 is plan view when a vehicle having a lighting device according to Exemplary Embodiment 2 of the present disclosure mounted thereon is viewed from above.

FIG. 13 shows a state in which lighting devices 106 according to Exemplary Embodiment 2 are mounted as traveling body on a vehicle.

In FIG. 13, vehicle 150 is a vehicle as a traveling body, and lighting devices 106 are arranged in front part F of front part F and back part B of a vehicle body of vehicle 150. Median strip 157 is a median strip on roadways. Parallel line beam 107 and line beam 158 are formed by two line lighting devices 106. Line beam 158 of lighting device 106 close to the median strip 157 is disposed so as to be shorter than opposing line beam 107.

An oncoming vehicle is less likely to be irradiated with light by shortening a length of line beam 158 closer to median strip 157. Since an area to be irradiated is reduced by shortening the length of line beam 158, it is possible to increase illuminance.

Figure 14:
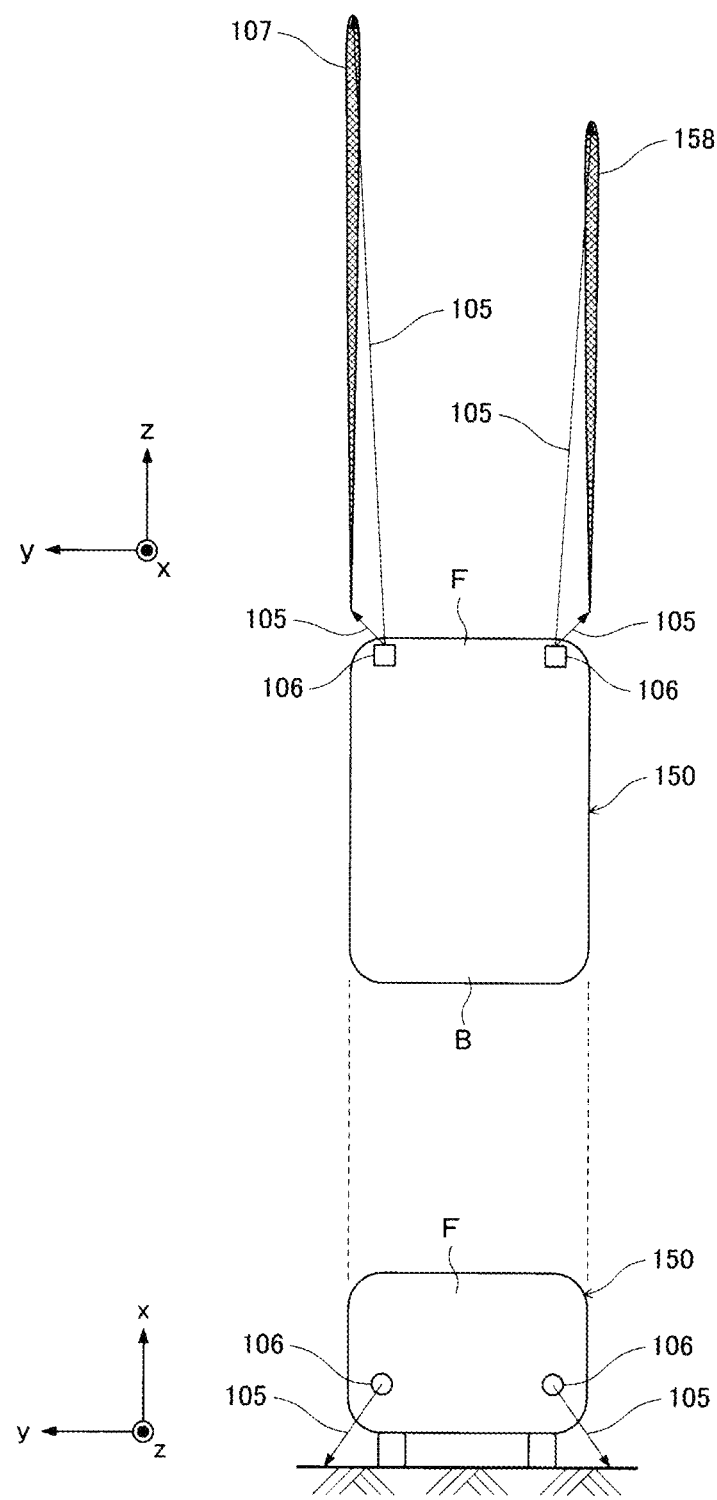
FIG. 14 shows a plan view (a) when the vehicle according to Exemplary Embodiment 2 of the present disclosure is viewed from above and a front view (b) when the vehicle is viewed from the front.

As shown in FIG. 14, line beam 107 and line beam 158 may be formed on irradiation surface 102 by rotating lighting devices 106 around the z-axis outwards from the center of the vehicle and emitting emission light rays 105 outwards from lighting devices 106. Accordingly, parallel line beam 107 and line beam 158 wider than a vehicle width of vehicle 150 can be formed.

When a road surface (irradiation surface 102) on which the vehicle is traveling is captured by an in-vehicle camera and road surface information is acquired, two approximately parallel line beams 107 and 158 from two lighting devices 106 may be used as reference lines when the road surface information is acquired by the camera.

(Exemplary Embodiment 3)

Figure 15:
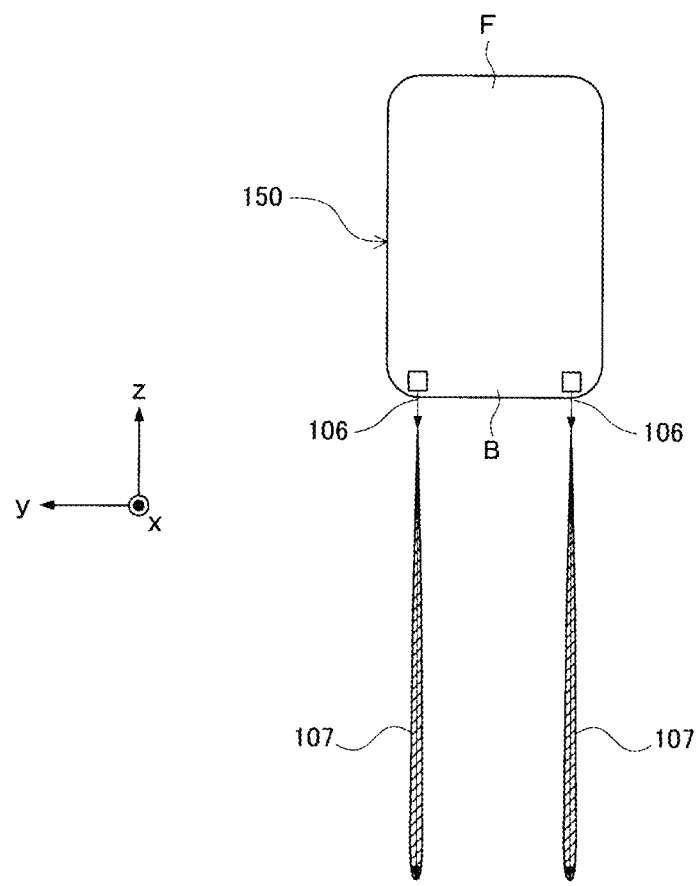
FIG. 15 is a plan view when a vehicle according to Exemplary Embodiment 3 of the present disclosure is viewed from above.

FIG. 15 shows Exemplary Embodiment 3 according to the present invention.

Lighting devices 106 are arranged on both sides of back part B of front part F and back part B of vehicle 150. The present exemplary embodiment is different from Exemplary Embodiment 2 in that the lighting devices are arranged in back part B of vehicle 150, that is, in the negative z-axis direction.

In Exemplary Embodiment 3, lighting devices 106 are turned on when vehicle 150 moves backwards, and line beams 107 are formed on the road surface. Thus, the line beams guide the vehicle to a position through which the vehicle passes in a backward direction, and a backward operation is able to be easily performed.

A pedestrian or a driver of another vehicle may ascertain that the vehicle moves forward or backward by setting emission color of lighting devices 106 arranged in back part B of vehicle 150 to be different from emission color of lighting devices 106 arranged in front part F of vehicle 150.

Lighting devices 106 may be attached to both sides of back part B and front part F of vehicle 150.

Line beams 107 are turned on only when the vehicle moves backwards, and are turned off when the vehicle moves forwards. Line beams 107 emitted backwards are useful to warn a following vehicle or a pedestrian, and thus, a driver of the vehicle recognizes a vehicle width of the vehicle when the vehicle moves backwards.

(Exemplary Embodiment 4)

Figure 16:
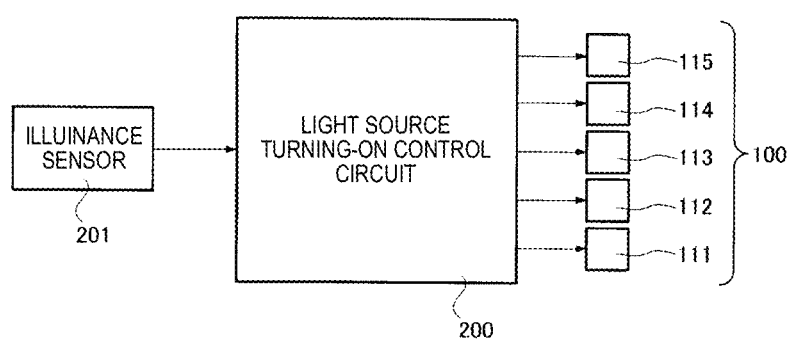
FIG. 16 is a configuration diagram of a control device of a vehicle according to Exemplary Embodiment 4 of the present disclosure.
Figure 17:
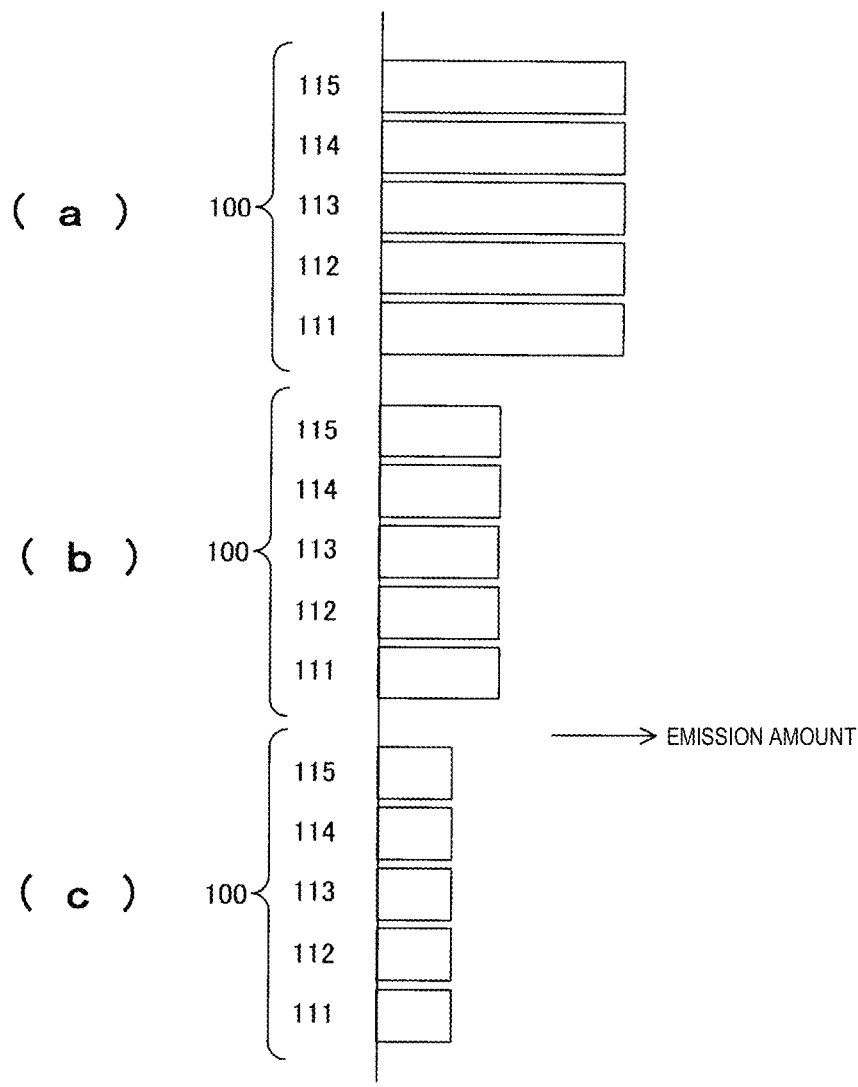
FIG. 17 shows a control state of the control device according to Exemplary Embodiment 4 of the present disclosure, and shows emission light amounts of light emitters in a case (a) where a surrounding region is bright, in a case (b) where the surrounding region is slightly dark, and in a case (c) where the surrounding region is darker.

FIGS. 16 and 17 illustrate Exemplary Embodiment 4 according to the present invention.

In Exemplary Embodiment 4, it is possible to improve the visibility of line beams 107 by changing the emission light amount of light source 100 of FIG. 1 according to the brightness of a surrounding region of vehicle 150 of FIGS. 14 and 15 in lighting device 106 of FIG. 1.

That is, when the surrounding region of vehicle 150 is bright, line beam 107 of FIG. 1 is brightened. In contrast, when the surrounding region of vehicle 150 is dark, the light amount is appropriately darkened such that line beam 107 is not excessively bright, and thus, visibility is improved.

In FIG. 16, light source turning-on control circuit 200 supplies current to light sources 100, and causes light sources 100 to emit light rays. Illuminance sensor 201 measures the brightness of the surrounding region of vehicle 150. The emission light amount of light source 100 is controlled by light source turning-on control circuit 200 according to the brightness measured by illuminance sensor 201. When the surrounding region is bright, the emission light amounts of all LEDs 111 to 115 of light source 100 are increased as shown in FIG. 17(a), and when the surrounding region is dark, the emission light amount of all LEDs 111 to 115 of light source 100 are further decreased than in the case of FIG. 17(a), as shown in FIG. 17(b). When the surrounding region is darker than in the case of FIG. 17(b), the emission light amounts of all LEDs 111 to 115 of light source 100 are further decreased than in the case of FIG. 17(b), as shown in FIG. 17(c).

As stated above, it is possible to improve the visibility of line beam 107 by changing the brightness of line beam 107 of FIG. 1 according to the brightness of the surrounding region.

Light source turning-on control circuit 200 controls current supply to light sources 100 of lighting devices 106 in front part F of vehicle 150, controls current supply to light sources 100 of lighting devices 106 in back part B of vehicle 150, or controls current supply to light sources 100 of lighting devices 106 in front part F and lighting devices 106 in back part B of vehicle 150.

The following operations are performed instead of illuminance sensor 201. That is, a mechanism for mechanically changing an angle of lighting devices 106 of FIG. 1 around the y-axis is prepared, and light source turning-on control circuit 200 controls such that this mechanism is linked with a speedometer. Thus, when a speed of vehicle 150 is fast, the length of line beam 107 is set to be greater than the length of line beam 107 when the speed of vehicle 150 is slow. When the speed of vehicle 150 is slow, the length of line beam 107 may be set to be less than the length of line beam 107 when the speed of vehicle 150 is fast.

The rotation around the z-axis described in FIG. 14 of Exemplary Embodiment 2 is linked with the speedometer of the vehicle. The faster the speed, the longer the line, and the slower the speed, the shorter the line. Accordingly, it is possible to improve visibility.

(Exemplary Embodiment 5)

FIG. 18, FIG. 19(a), FIG. 19(b), FIG. 19(c), FIG. 20(a), FIG. 20(b), and FIG. 20(c) illustrate Exemplary Embodiment 5.

In Exemplary Embodiment 4, illuminance sensor 201 and light source turning-on control circuit 200 are provided, and the emission light amount of light source 100 is changed according to the brightness of the surrounding region of vehicle 150. Exemplary Embodiment 5 is different from Exemplary Embodiment 4 in that a tilt sensor and a light source turning-on control circuit are provided and the emission light amount of the light source is changed according to a tilt of the vehicle.

Figure 18:
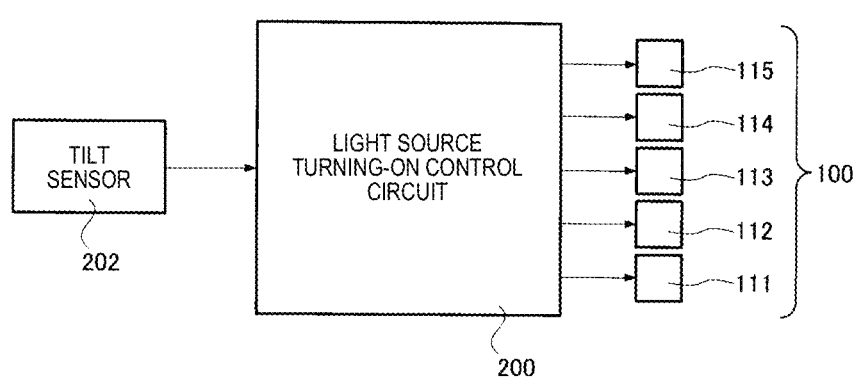
FIG. 18 is a configuration diagram of a control device of a vehicle according to Exemplary Embodiment 5 of the present disclosure.

In FIG. 18, tilt sensor 202 is a tilt sensor that is provided at vehicle 150 of FIG. 13 and detects the tilt of vehicle 150. A measurement value of tilt sensor 202 is input to light source turning-on control circuit 200, and the emission light amounts of LEDs 111 to 115 of light source 100 are controlled according to the tilt measurement value.

When tilt sensor 202 indicates that the tilt of the vehicle is horizontal, the emission light amounts of the plurality of LEDs 111 to 115 of light source 100 are controlled such that the light amounts of the LEDs closer to the road surface are decreased in order. That is, light source turning-on control circuit 200 controls such that the light amount is decreased according to the tilt like an example in which LED 111 is darkest and LED 112 is darkened.

When tilt sensor 202 indicates that front part F of vehicle 150 of FIG. 13 tilts downwards, the LEDs are turned on such that the light amounts of LED 111 and LED 112 are increased as much as the light amounts of LED 113 to LED 115. When tilt sensor 202 indicates that front part F of vehicle 150 tilts upwards, the light amounts of LED 111, LED 112, and LED 113 are decreased from the darker side according to the value of tilt sensor 202.

FIG. 20(a) shows a state in which vehicle 150 does not tilt. FIG. 20(b) shows a state in which front part F tilts downwards. FIG. 20(c) shows a state in which front part F tilts upwards.

Figure 19:
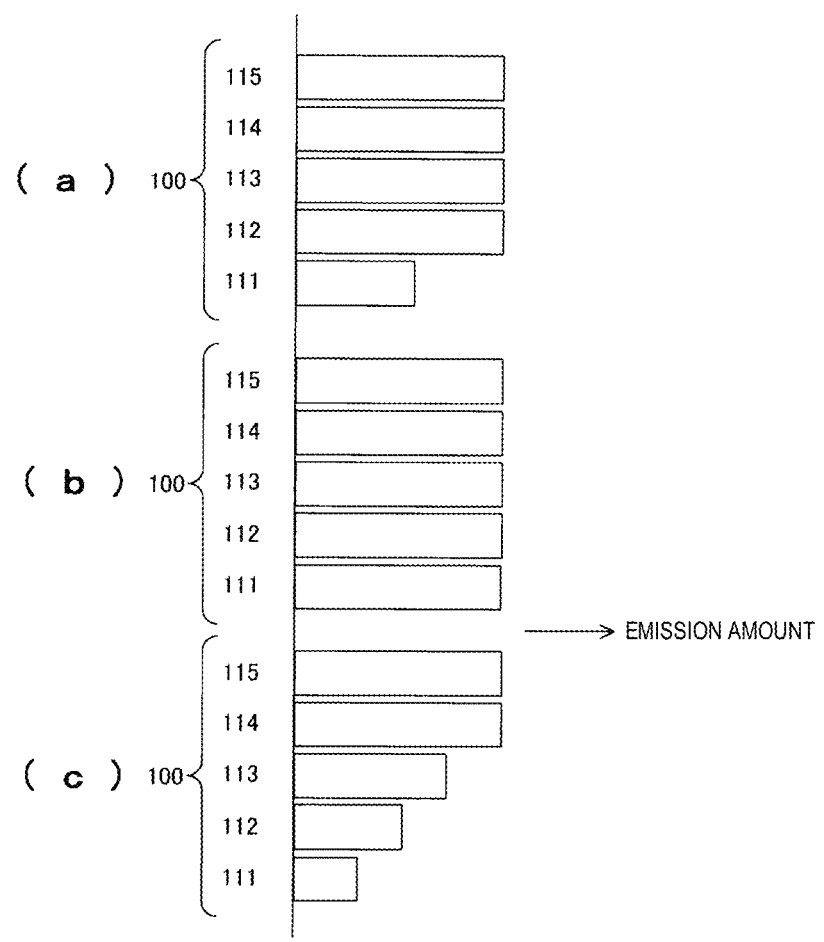
FIG. 19 shows a control state of the control device according to Exemplary Embodiment 5 of the present disclosure, and shows emission light amounts of light emitters in a case (a) where the vehicle has a horizontal posture, in a case (b) where the vehicle has a posture of which a front part tilts downward, and in a case (c) where the vehicle has a posture of which the front part tilts upwards.

When front part F of vehicle 150 tilts downwards as shown in FIG. 20(b), a side closer to vehicle 150 is irradiated with line beam 107, that is, an irradiation position is further shifted in the negative z-axis direction than in a case where vehicle 150 does not tilt as shown in FIG. 20(a). Light source turning-on control circuit 200 that reads the information indicating that front part F of vehicle 150 tilts downwards from tilt sensor 202 turns on all LEDs 111 to 115 of light source 100 such that these LEDs become bright as shown in FIG. 19(b), and the road surface is irradiated with line beam 107 from line distal end 108 to line proximal end 109.

In a state in which vehicle 150 does not tilt as shown in FIG. 20(a), when it is assumed that all LEDs 111 to 115 of light source 100 are turned on such that these LEDs become bright, line proximal end 109 of line beam 107 of FIG. 20(a) is further away from vehicle 150 than the line proximal end of FIG. 20(b), and virtual line distal end 108 is also further away from vehicle 150 than the proximal end of FIG. 20(b). However, light source turning-on control circuit 200 that reads the information indicating that vehicle 150 does not tilt from tilt sensor 202 controls LEDs 111 to 115 of light source 100 such that LED 111 is darkest and LED 112 is darkened by decreasing the light amounts of the LEDs closer to the road surface in order as shown in FIG. 19(c). Thus, actual effective line distal end 203 of line beam 107 when viewed from vehicle 150 is closer to vehicle 150 than virtual line distal end 108. For example, light source turning-on control circuit 200 controls the light amounts of LEDs 111 to 115 such that the position of line distal end 203 is the position of line distal end 108 of FIG. 20(b) or is approximately the same as the position of line distal end 108 of FIG. 20(b).

In a state in which front part F of vehicle 150 tilts upwards as shown in FIG. 20(c), when it is assumed that all of LEDs 111 to 115 of light source 100 are turned on such that these LEDs become bright, line proximal end 109 of line beam 107 of FIG. 20(c) is further away from vehicle 150 than line proximal end 109 of FIG. 20(b), and virtual line distal end 108 is also further away from vehicle 150 than line distal end 108 of FIG. 20(b). That is, the irradiation position is shifted in the positive z-axis direction, and the road surface is irradiated. However, light source turning-on control circuit 200 that reads the information indicating that front part F of vehicle 150 tilts from tilt sensor 202 controls LEDs 111 to 115 of light source 100 such that the light amount of LED 113 is decreased in addition to LED 111 and LED 112 as shown in FIG. 19(c). Accordingly, virtual line distal end 108 of line beam 107 comes into contact with the light source, and becomes line distal end 204. For example, light source turning-on control circuit 200 controls the light amount of LEDs 111 to 115 such that the position of line distal end 204 when viewed from vehicle 150 is the position of line distal end 108 of FIG. 20(b) or is approximately the same as the position of line distal end 108 of FIG. 20(b).

As stated above, when vehicle 150 tilts, light source turning-on control circuit 200 individually adjusts the light amounts of LEDs 111 to 115 based on the measurement value of tilt sensor 202. As a result, it is possible to reduce a position variation of line distal end 108 of line beam 107 when viewed from vehicle 150, and it is possible to improve visibility.

Although it has been described that the light amounts of LEDs 111, 112, and 113 are changed in order to control the length of the line, the light amounts of LEDs 111 to 114 or all LEDs 111 to 115 may be controlled.

The position of line distal end 108 of line beam 107 may be adjusted by using an acceleration sensor as tilt sensor 202 and detecting only a tilt at an acceleration of vehicle 150.

Although it has been described that the adjustment of line distal end 108 of line beam 107 is controlled in a state in which the LEDs of light source 100 are turned on, the entire lighting device 106 may tilt. Alternatively, the position adjustment of line distal end 108 of line beam 107 may be performed by moving light source 100 or lens 101 in the x-axis direction of FIG. 1.

The number of LEDs of light source 100 is not limited to five.

It has been described in Exemplary Embodiment 4 that the mechanism for mechanically the angle of lighting device 106 around the y-axis is linked with the speedometer. However, the length of the line may be changed by controlling the emission light amounts of LEDs 111 to 115 while linking the mechanism with the speedometer as in Exemplary Embodiment 5 without preparing the mechanism for mechanically changing the angle of lighting device 106 around the y-axis.

(Exemplary Embodiment 6)

Figure 21:
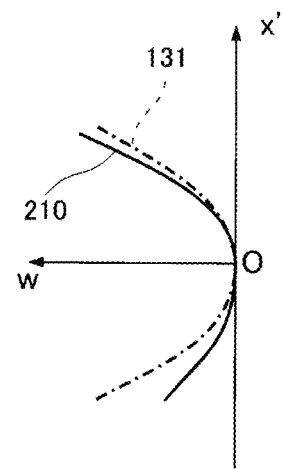
FIG. 21 is a graph for describing an example of a shape of a lens of a lighting device according to Exemplary Embodiment 6 of the present disclosure.
Figure 22:
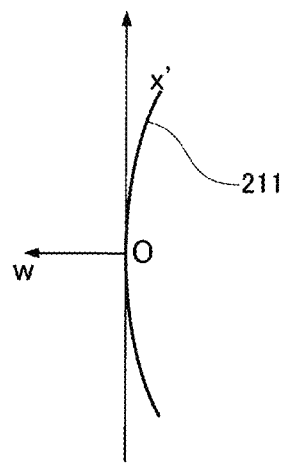
FIG. 22 is a graph showing a quadratic function shape added to the emission surface of the lens shown in FIG. 4.

FIG. 21, FIG. 22, FIG. 23(a), and FIG. 23(b) illustrate Exemplary Embodiment 6 of the present invention. Similarly to FIG. 4, the lens shape of emission surface 121 of lens 101 is shown in FIG. 21. In FIGS. 21 and 22, the same constituent elements as those FIG. 4 will be assigned the same reference marks, and thus, the description thereof will be omitted.

As shown in FIG. 21, shape 210 of lens 101 on the x'w section is a shape formed by adding shape 211 of FIG. 22 to lens shape 130 of the emission surface of FIG. 4. Shape 211 is an even function shape, that is, a quadratic function shape, which is formed by applying defocus to lens 101 on the x'w section.

In Exemplary Embodiment 1, line beam 107 is lengthened such that line proximal end 109 of line beam 107 of FIG. 1(a) comes into contact with light source 100 by adding the odd function shape to lens 101 as shown in FIG. 4. In Exemplary Embodiment 6, defocus occurs by further adding the quadratic function on the x'w section, and thus, a light intensity distribution is a distribution in which light intensity is continuously and gradually decreased in a direction in which line distal end 108 of line beam 107 is far away from light source 100, that is, a distribution is color-graded.

Figure 23:
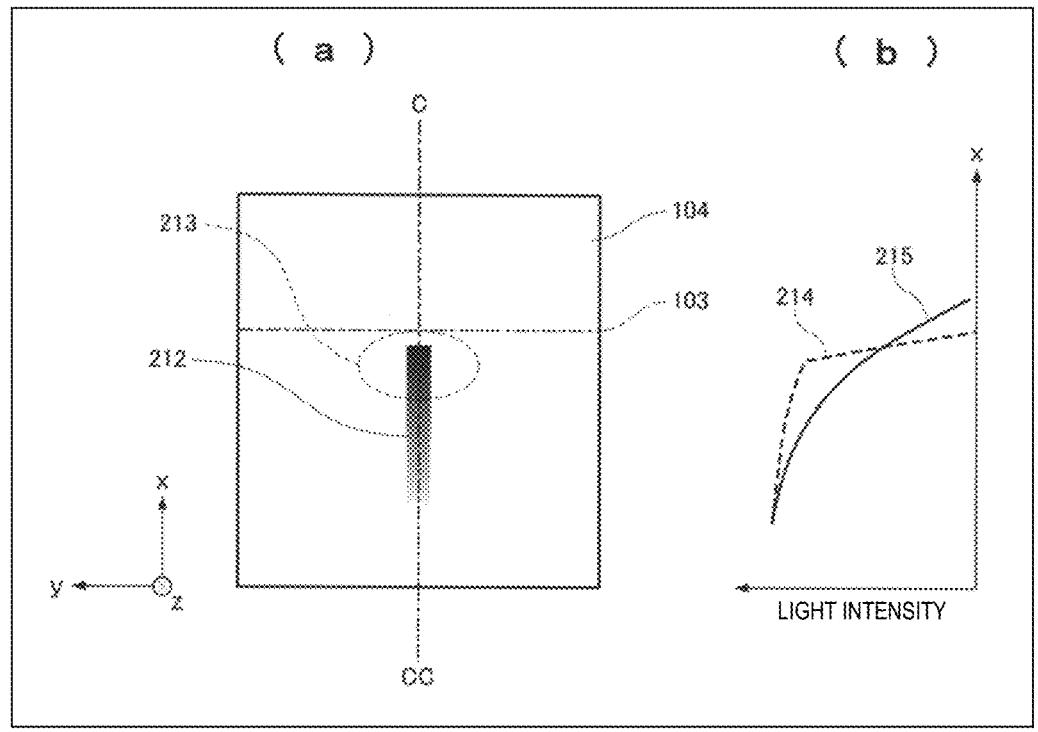
FIG. 23 shows an illuminance distribution diagram (a) on an observation surface according to Exemplary Embodiment 6 of the present disclosure and a diagram (b) showing light intensity on a C-CC line near line distal end 108.

FIG. 23(a) shows an illuminance distribution on observation surface 104 similarly to FIG. 11.

Illuminance distribution 212 indicates an illuminance distribution due to lens 101. Line distal end portion 213 is a portion corresponding to a region near line distal end 108. Line intensity in a C-CC line of line distal end portion 213 is shown in FIG. 23(b).

Line intensity distribution 214 of FIG. 23(b) is a light intensity distribution when the odd function is added to the x'w section as in Exemplary Embodiment 1, and light intensity distribution 215 is a light intensity distribution when the odd function is added to the x'w section and the even function shape to which defocus is applied is added. The even function to which the defocus is applied is added, and a light intensity distribution at line distal end 108 is color-graded. Thus, it is difficult to ascertain a boundary. For example, line distal end 108 of line beam 107 is color-graded. Thus, when lighting device 106 is attached to vehicle 150 and the vehicle body tilts forwards and backwards at the acceleration of vehicle 150 as shown in FIG. 20, the irradiation position of line beam 107 varies, and visibility is degraded when viewed by the driver. However, line distal end 108 is color-graded, and thus, it is difficult to ascertain a position change of line beam 107. Accordingly, it is possible to prevent visibility from being degraded.

The gradation of line distal end 108 of line beam 107 may be changed as gently as possible, and such a gradation change is desirably the same as, for example, a change in a gradation intensity distribution near a cutoff line of a low beam of a headlamp of the vehicle.

Line distal end 108 of line beam 107 is not able to stand out by positioning the position of line distal end 108 of line beam 107 in a position which is near the cutoff line of the low beam of the headlamp of the vehicle and is lower than the cutoff line.

Lighting device 106 may be disposed in the headlamp or may be disposed in a position separated from the headlamp.

(Exemplary Embodiment 7)

Figure 24:
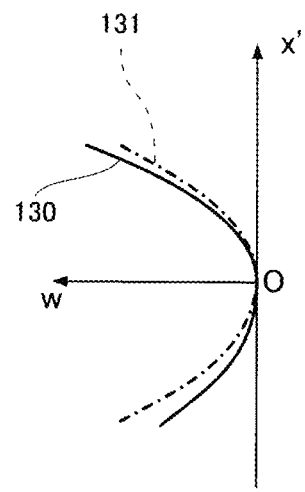
FIG. 24 is a graph for describing an example of a shape of a lens according to Exemplary Embodiment 7 of the present disclosure.
Figure 25:
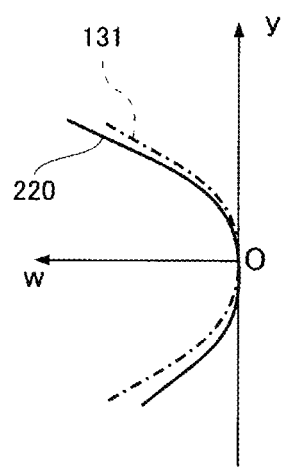
FIG. 25 is a graph for describing the shape of the lens on an yw section of the lens according to Exemplary Embodiment 7 of the present disclosure.
Figure 26:
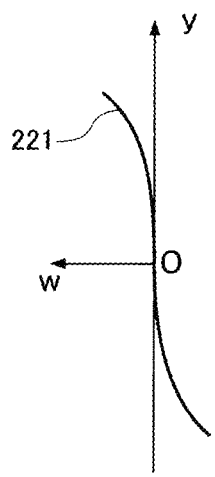
FIG. 26 is a graph showing an odd function component on the yw section of the lens according to Exemplary Embodiment 7 of the present disclosure.

FIGS. 24, 25, and 26 are diagrams illustrating Exemplary Embodiment 7, and show the lens shapes of emission surface 121 of lens 101. In FIGS. 24, 25, and 26, the same constituent elements as those FIG. 4 will be assigned the same reference marks, and thus, the description thereof will be omitted.

The shape of lens 101 on the x'w section is shown in FIG. 24, but is the same as that of FIG. 4 according to Exemplary Embodiment 1. The odd function shape is added on the yw section similarly to x'w section as shown in FIG. 25, but is different from that of Exemplary Embodiment 1. FIG. 26 shows odd function shape 221.

Figure 27:
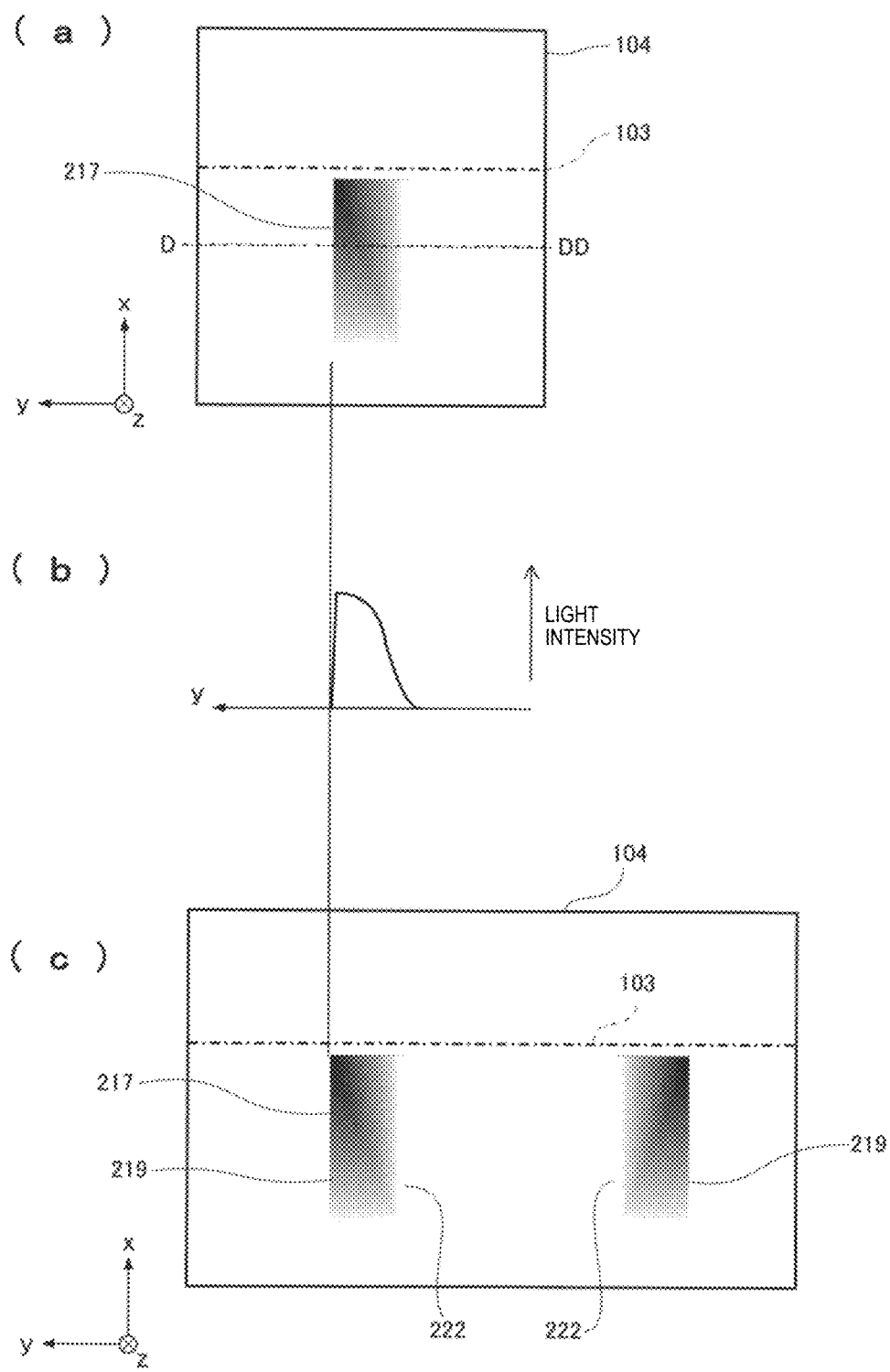
FIG. 27 shows an emission light distribution (a) of observation surface 104 according to Exemplary Embodiment 7 of the present disclosure, a light intensity distribution diagram (b) on a D-DD line, and a light intensity distribution diagram (c) on observation surface 104 when two lighting devices 106 are arranged such that edges thereof face outwards.
Figure 28:
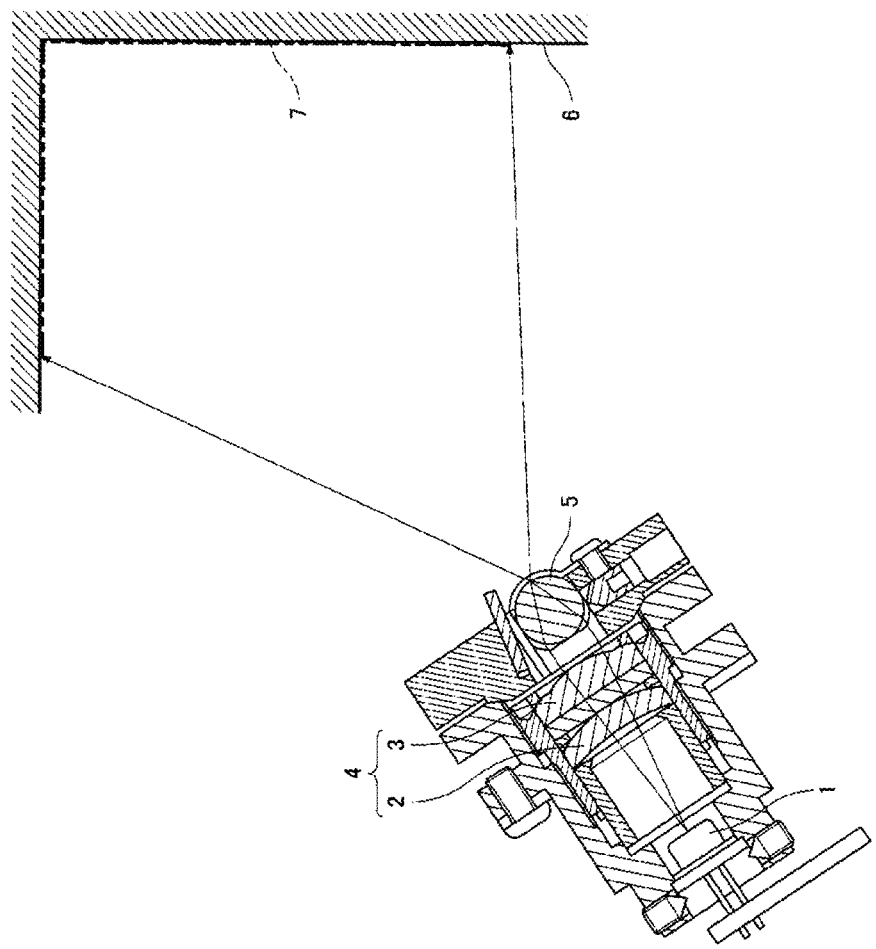
FIG. 28 is a diagram showing a line lighting device described in PTL 1.

Similarly to a case where the beam is lengthened in the negative x-axis direction on observation surface 104 (FIG. 1) by adding the odd function shape which is monotonically increased in the positive x-axis direction shown in FIG. 6 on the x'2 section in Exemplary Embodiment 1, lens shape 220 of FIG. 25 is acquired by odd function shape 221 which is monotonically increased in the positive y-axis direction on the y'w section. By doing this, light distribution 217 in which the emission light from lens 101 also spreads in the negative y-axis direction on observation surface 104 is acquired, as shown in FIG. 27(a). A light intensity distribution in D-DD line of FIG. 27(a) is shown in FIG. 27(b). A distribution in which the light intensity is gentle in the negative y direction, but is a distribution in which an edge of the light intensity distribution remains in the positive y direction.

A light intensity distribution on observation surface 104 when two lighting devices 106 are arranged such that the edges thereof face outwards is shown in FIG. 27(c).

When lighting devices 106 are arranged at vehicle 150 of FIG. 13, the edges of outsides 219 of line beam 107 may be clear or the light intensity distribution of inside 222 may be gentle in order to represent the width of vehicle 150.

The odd function shape is added on the yw section in addition to the addition of the odd function shape to x'w section of lens 101, and thus, it is possible to secure the visibility of line beam 107 even though the edges remain on outsides 219 of line beam 107 and the distribution in which inside 222 is gentle is acquired.

Although it has been described in the exemplary embodiments that lighting devices 106 are mounted on the vehicle, the lighting devices may be applied to a motorcycle, a tricycle, a wheelchair, and various traveling bodies such as aircraft which travel on a road surface in addition to the vehicle.

INDUSTRIAL APPLICABILITY

The present disclosure is applicable to a lighting device that is capable of forming a line beam having a sufficiently long length in an irradiation direction and illuminates an irradiation surface, and a traveling body using the same.

REFERENCE MARKS IN THE DRAWINGS

100 LIGHT SOURCE
101 LENS
102 IRRADIATION SURFACE
103 HORIZONTAL PLANE
104 OBSERVATION SURFACE
105, 116, 118, 119, 135 EMISSION LIGHT RAY
106 LIGHTING DEVICE
107, 117, 158 LINE BEAM
108, 203, 204 LINE DISTAL END
109, 110 LINE PROXIMAL END
111, 112, 113, 114, 115 LED
120 INCIDENT SURFACE
121, 134 EMISSION SURFACE
122 LENS CENTER AXIS
123 LENS CENTER
130, 131, 220 LENS SHAPE
132 CUBIC FUNCTION
133 SLOPE COMPONENT
140, 141, 212 ILLUMINANCE DISTRIBUTION
150 VEHICLE
151, 152, 153, 154, 155 INDIVIDUAL ILLUMINANCE CHANGE
156 OVERALL ILLUMINANCE CHANGE
157 MEDIAN STRIP

The invention claimed is:

1. A lighting device that forms a line beam on a road surface, the lighting device comprising:
   a light source that includes a plurality of light emitters arranged in a line; and
   a lens that is disposed in a direction in which light is emitted from the light source, and in which at least one of an incident surface and an emission surface is a curved surface,
   wherein a contour shape of the emission surface is a shape represented by a cubic function defined around a center of the lens and having a single real root added to a curve having a constant curvature,
   the light emitted from the light source is refracted by the lens to be incident on the road surface to form the line beam,
   the light emitters form an elongated straight line shape which is arranged perpendicular to the road surface, and
   a distance between the road surface and an end of the elongated straight line shape formed by the light emitters closest to the road surface is greater than a distance between the road surface and the center of the lens.

2. A traveling body that is mounted with the lighting device of claim 1.

3. The traveling body of claim 2,
   wherein gradation in which brightness is continuously changed with a position is formed at a line distal end of the line beam.

4. The lighting device of claim 1,
   wherein only the contour shape of a first side of the emission surface is the shape represented by the cubic function defined around the center of the lens having the single real root, the first side being further away from the road surface than a vertex of the contour shape.

5. The lighting device of claim 1,
   wherein a distance between a light emitter disposed in a position farthest away from the road surface among the plurality of light emitters in the light source and a center of the lens is greater than a distance between a light emitter disposed in a position closest to the road surface and the center of the lens among the plurality of light emitters in the light source.

6. The lighting device of claim 1,
   wherein the light emitter is a light-emitting diode.

7. A traveling body that is mounted with the lighting device of claim 1, and is configured to control a light amount of the plurality of light emitters of the light source based on a sensor measurement value acquired by measuring at least one of a traveling speed, brightness of a traveling environment, and a tilt angle of a vehicle body.

* * * * *